US012505719B2

(12) United States Patent
Keylian et al.

(10) Patent No.: US 12,505,719 B2
(45) Date of Patent: Dec. 23, 2025

(54) BARTOP GAMING UNIT

(71) Applicant: Playrtech LLC, Las Vegas, NV (US)

(72) Inventors: Pierre Keylian, Henderson, NV (US); Ara Tcholakian, Las Vegas, NV (US); Ryan Banks, Las Vegas, NV (US); Ryan Baxter, Henderson, NV (US); Gonzalo Arteaga, Las Vegas, NV (US); Alberto Favela, Las Vegas, NV (US)

(73) Assignee: PLAYRTECH LLC, Las Vegas, NV (US)

( * ) Notice: Subject to any disclaimer, the term of this patent is extended or adjusted under 35 U.S.C. 154(b) by 344 days.

(21) Appl. No.: 18/234,065

(22) Filed: Aug. 15, 2023

(65) Prior Publication Data

US 2025/0061771 A1 Feb. 20, 2025

(51) Int. Cl.
*G07F 17/32* (2006.01)

(52) U.S. Cl.
CPC ...... *G07F 17/3216* (2013.01); *G07F 17/3211* (2013.01)

(58) Field of Classification Search
CPC .................................................... G07F 17/3216
See application file for complete search history.

(56) References Cited

U.S. PATENT DOCUMENTS

| | | | | |
|---|---|---|---|---|
| 6,688,984 B2 | 2/2004 | Cole | | |
| 8,870,663 B2 | 10/2014 | Cole | | |
| 11,721,162 B2 * | 8/2023 | McClearen | G07F 17/3213 | 463/20 |
| 2002/0183106 A1 * | 12/2002 | Cole | G07F 17/3216 | 463/16 |

* cited by examiner

*Primary Examiner* — Jasson H Yoo
(74) *Attorney, Agent, or Firm* — Snell & Wilmer LLP

(57) ABSTRACT

A bar top gaming unit is configured to be mounted to or in a support surface such as a bar top. The unit has a housing and a top door which is movable between open and closed positions for accessing the interior of the housing. A biasing element such as a strut generates a biasing force to aid in opening of the top door, wherein the biasing element extends at a negative angle when the top door is in a closed position. The unit includes a player tracking unit which is mounted independently of the top door, allowing the top door to be opened and closed without removing or moving the player tracking unit. At least a portion of the periphery of the top of the top door may be defined by a peripheral edge of a video display cover panel, which may also be edge lit.

12 Claims, 7 Drawing Sheets

BARTOP GAMING UNIT

FIELD OF THE INVENTION

The present invention relates to housings or cabinets for gaming devices, and particularly for location in a bar top or similar environment.

BACKGROUND OF THE INVENTION

A wide variety of configurations of gaming machines are well-known. For use on a casino floor, such gaming machines often have a "slant top" or "upright" configuration where the cabinet of the gaming machine extends generally vertically. This allows the gaming machine to be set on the floor or on a gaming machine stand and have a height which is suitable for play by a player.

This style of gaming machine, however, does not work well in bar top environments. In a bar top environment, the bar has a raised serving surface, such that if the gaming machine is placed thereon, it would be too tall to be played by a player and would also block the bar behind the bar top. As a result, bar top gaming machines generally have a low profile, with a housing which is desired to sit at least partially below the bar top surface and having a top which is located at or above the bar top. The game display is associated with the top of the bar top gaming machine so that it sits at or slightly above the bar top and can easily be viewed by a player sitting at the bar.

Several problems exist with existing bar top gaming machines. For example, these gaming machines are often difficult to service and/or have expensive and complex designs owing to their unique configuration.

An improved bar top gaming unit is desired.

SUMMARY OF THE INVENTION

Aspects of the invention comprise a bar top gaming unit or machine, including a configuration thereof and features thereof.

In one embodiment, a bar top gaming unit comprises a housing having a base and at least one wall extending upwardly to a top, the housing generally defining an interior area and the housing having a front and a rear, a frame mounted to the housing and extending upwardly from the top of the housing, the frame having a front and a rear, a top door rotatably mounted to the frame at the rear thereof, the top panel movable between a first position in which the top of the housing is generally open providing access to the interior area and a second position in which the top door cooperates with the frame to generally close the top of the housing, and at least one biasing strut, the biasing strut having a first end and a second end, the first end mounted to the frame and the second end mounted to the top door, the biasing strut extending downwardly at an angle below horizontal from a rear towards the front of the housing when the top door is in the second position, and wherein the biasing strut biases the top door upwardly when the top door is in the first position.

In another embodiment, a bar top gaming unit comprises a housing having a base and at least one wall extending upwardly to a top, the housing generally defining an interior area, the housing having a front and a rear, a top door rotatably mounted to the housing at the rear thereof, the top panel movable between a first position in which the top of the housing is generally open providing access to the interior area and a second position in which the top door generally closes the top of the housing, and a player tracking unit, the player tracking unit mounted to the housing and located at the rear of the housing, the player tracking unit comprising a housing and a display, a front of the player tracking unit located above the top door when the top door is in the second position and the player tracking unit spaced from the top door to permit the top door to be moved between the first and second positions while the player tracking unit remains stationary.

In yet another embodiment, a bar top gaming unit comprises a housing having a base and at least one wall extending upwardly to a top, the housing generally defining an interior area, the housing having a front and a rear, a top door rotatably mounted to the housing at the rear thereof, the top panel movable between a first position in which the top of the housing is generally open providing access to the interior area and a second position in which the top door generally close the top of the housing, where the top door comprises a base, a video display mounted to the base, and a cover panel, the cover panel having a peripheral edge, at least a portion of the peripheral edge forming at least a portion of the peripheral edge of a top of the top door.

Further objects, features, and advantages of the present invention over the prior art will become apparent from the detailed description of the drawings which follows, when considered with the attached figures.

DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
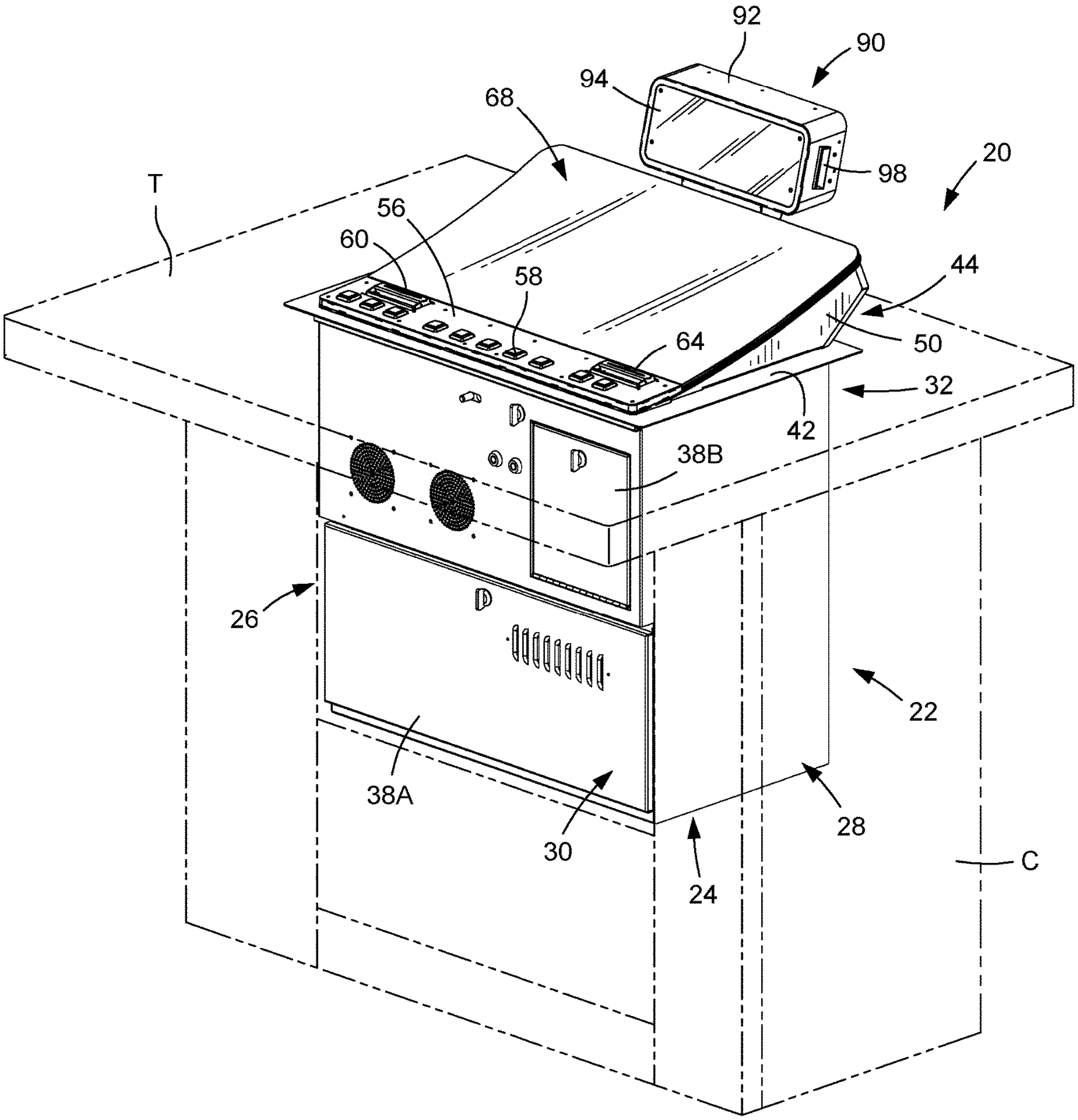
FIG. 1 is a front perspective view of a bar top gaming unit in accordance with an embodiment of the invention, shown in relation to a bar.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One aspect of the invention is a bar top gaming unit or machine. It is noted that aspects of the invention relate to the configuration of a housing and/or other components of a bar top gaming machine. While the housing and related components comprise a portion of a completed bar top gaming machine that is configured to present one or more wagering games, it will be appreciated that some elements of a completed bar top gaming machine (for example, a gaming machine controller, etc., as further described below) are not required.

One embodiment of a bar top gaming unit 20 will be described with reference to FIGS. 1 and 2. As illustrated therein, the bar top gaming unit 20 includes a housing 22. In one embodiment, the housing 22 is defined by a bottom or base 24 and at least one wall extending upwardly from the base. In a preferred embodiment, first and second sides 26,28 extend upwardly from opposing edges of the base 23. The housing 22 also includes front and rear walls 30,32 which extend upwardly from the base 24. The front and rear walls 30, 32 extend between the first and second sides 26,28, the walls and sides defining a perimeter of the housing 22. In such an embodiment, the housing 22 is generally rectangular in shape, where the front and rear walls 30,32 are longer than the first and second sides 26,28. Of course, the housing 22 might have other shapes, such as generally square, or where one or more of the sides or walls thereof are not linear, etc.

Figure 2:
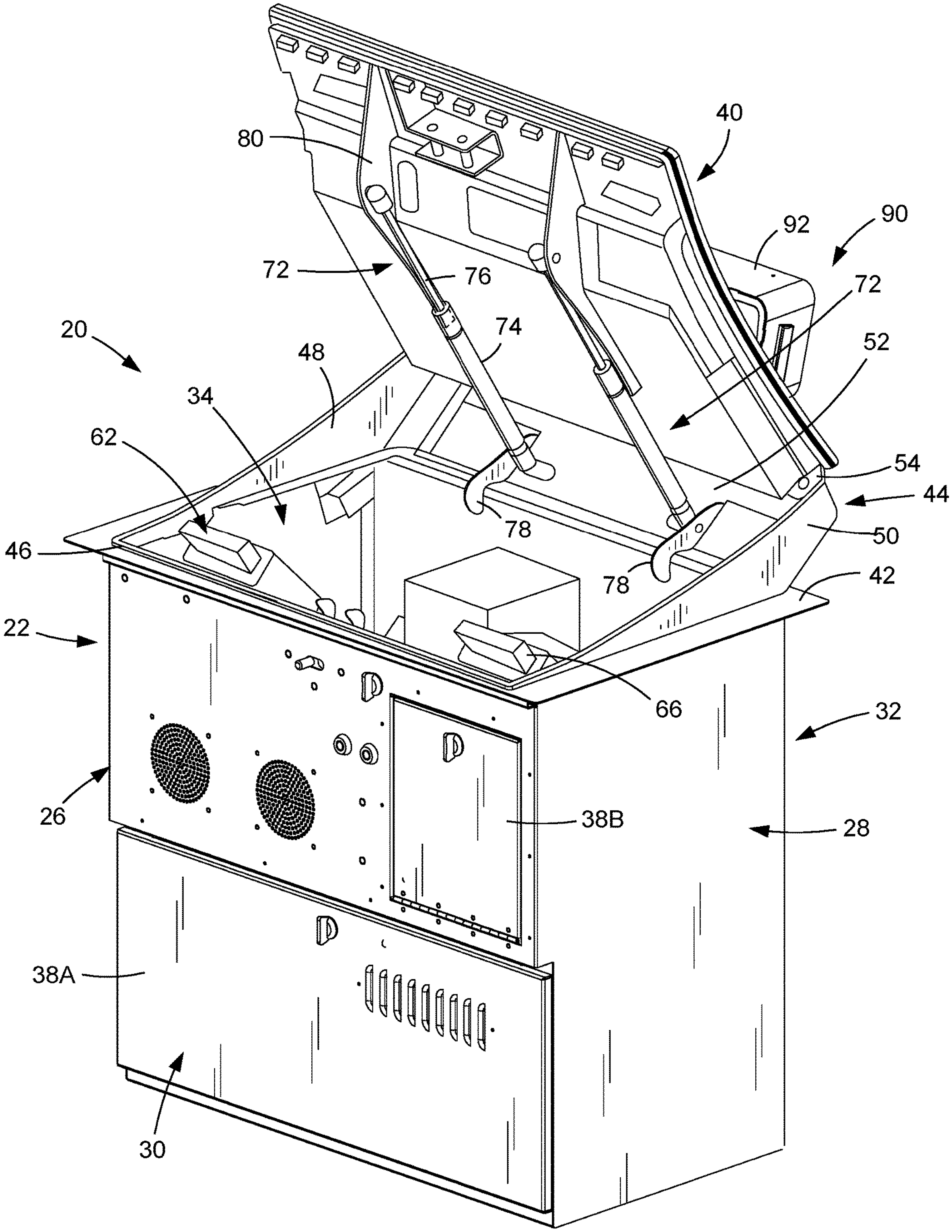
FIG. 2 is a front perspective view of the bar top gaming unit illustrated in FIG. 1 with a top door thereof in an open position.

The base 24, first and second sides 26,28 and front and rear walls 30,32 define a generally closed interior area 34 (see FIG. 2). The first and second sides 26,28 and front and rear walls 30,32 have a top edge forming the perimeter of a generally open top of the housing 22.

In one embodiment, the front wall 30 may have one or more openings therein providing access to the interior 34 of the housing 22. At least one panel or door 38A,B may be movably connected to the housing 22 for selectively opening and closing the opening(s) in the front wall 30. These panels or doors 38A,B, may have at least one locking element associated therewith, such as a key operated lock or an internally accessible latch, etc. for selectively controlling opening and closing thereof. For example, in one embodiment, a locking mechanism may comprise a simple rotating latch. The latch of the locking mechanism may be positioned at a rear of the panel 38A,B, with a key accepting actuator extending from a front side of the panel through the panel to the latch for rotating the latch. In use, turning of a key causes the latch to rotate into a first position in which it extends behind a portion of the front wall 30 opposing the panel 38A,B, preventing the front panel from being moved to an open position. Rotation of the latch into a second position out of engagement with the front wall 30 permits the panel to be opened. Further, similar openings might be provided at the side 26,28 or rear 32 of the housing 22 in a similar manner.

In one configuration, a flange 42 is located at the top of the housing 22, such as at the top of the wall forming the sides 26,28, front 30 and/or rear 32. In one embodiment, the flange 42 extends outwardly generally horizontally (such as a right angle to the sides 26,28 and front and rear walls 30,32) from the top of the housing 22 around the periphery thereof. In other embodiments, the flange 42 might not extend continuously around the top of the housing 22.

As illustrated in FIG. 1, in use, the bar top gaming unit 20 is advantageously configured to use with a bar having a cabinet C with a top T. The housing 22 is preferably configured to fit within an opening defined by the cabinet C, such as by being placed downwardly through an opening in the top T. In such a configuration, the flange 42 may be configured to rest on the top T of the bar, thus providing support for the bar top gaming unit 20.

In one configuration, a top door 40 cooperates with a frame 44 to selectively open and close the top of the housing 22, and thus control access to the interior 34 of the housing 22. In one embodiment, the top door 40 comprises a base member or support 41 (best illustrated in FIG. 3) for supporting the components thereof, such as a console 58 and a video display 68, as described in more detail below.

In one embodiment, a frame 44 extends upwardly from the housing 22. The frame 44 is preferably located at the top of the housing 22 and has a front 46, first and second sides 48,50 and a rear 50 which generally correspond to the first and second sides 26,28 and the front and rear walls 30,32 of the housing 22.

As illustrated in FIG. 2, the front 46 of the frame 44 may extend upwardly a first distance from the housing 22 above the flange 42, while the rear 52 may extend upwardly a second distance above the flange 42. Preferably, the second distance is greater than the first distance. In this manner, as detailed below, the top door 40 (and associated video display 68) slopes upwardly from front to back at an angle from horizontal. In such a configuration, the first and second sides 48,50 of the frame 44 may extend upwardly a variable distance from the housing 22, such as a greater distance at the rear than the front. Further, as illustrated, the rear 52 of the frame 44 may extend not only upwardly from the housing 22, but at an angle thereto, such as whereby the rear 52 of the frame 44 extends rearwardly of the housing 22. As illustrated, the frame 44 generally extends the open top of the housing 22 upwardly to a point above the bar top T.

It will be appreciated that while the frame 44 may comprise one or more elements which are mounted to the housing 22 (such as metal members which are connected to metal members forming the housing 22), the frame 44 may comprise a portion of the housing 22, such as extended portions of the sides and front and rear walls, etc. (whereby the frame 44 effectively comprises a portion of the housing 22).

Figure 4B:
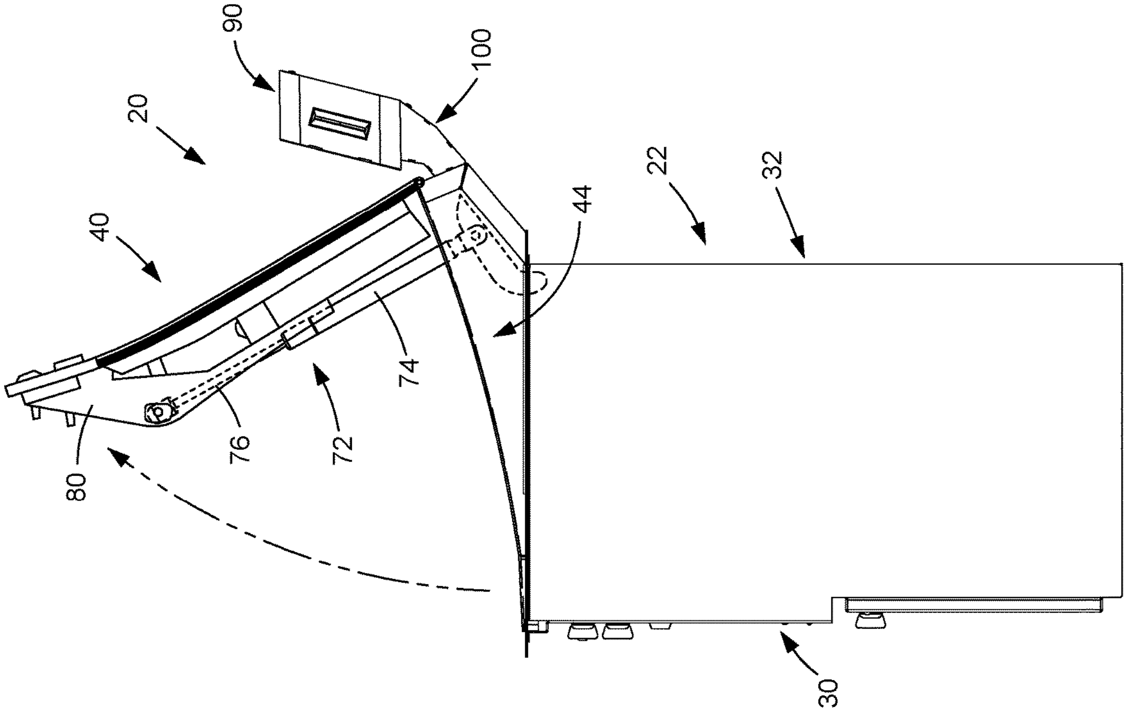
FIGS. 4A and 4B are side views of the bar top gaming unit illustrated in FIG. 1 showing the top door in a closed position and in an open position.
Figure 4A:
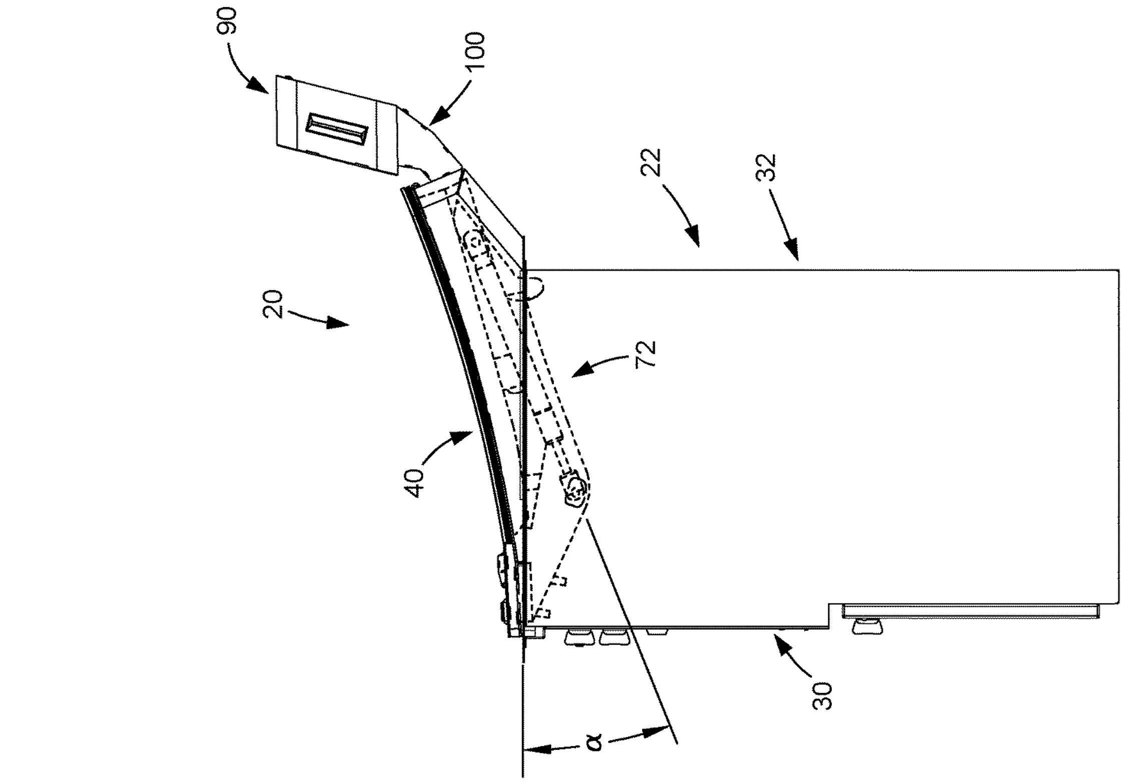
Figure 6:
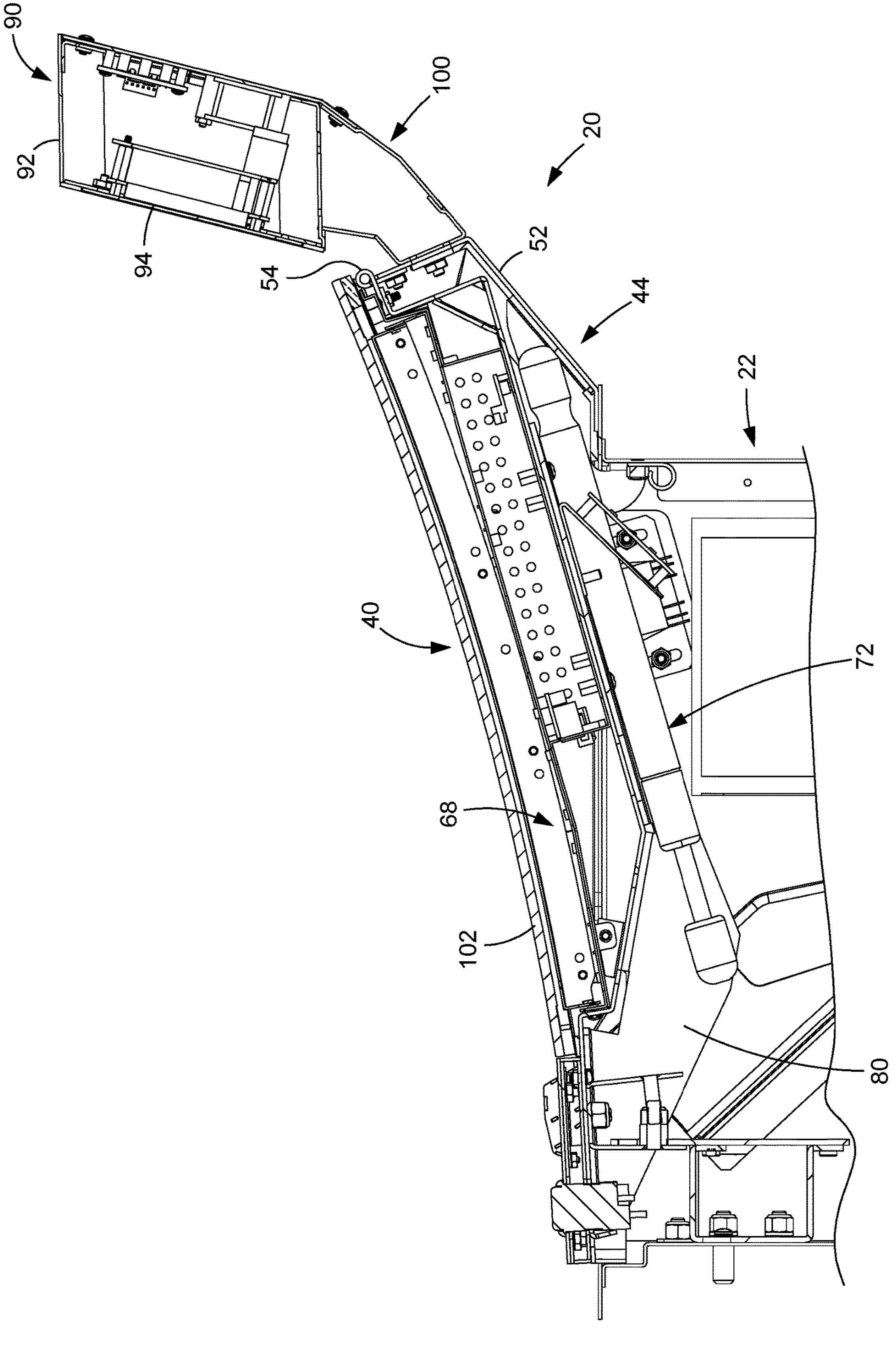
FIG. 6 is a cross-sectional view of the top door and an associated player tracking unit of the bar top gaming unit illustrated in FIG. 1.

In a preferred embodiment, as best illustrated in FIG. 6, the top door 40 is movably mounted to the frame 44, such as by a hinge 54 that connects a back edge of the base member 41 of the top door 40 to the rear 52 of the frame 44. As illustrated in FIGS. 1 and 4A, the hinge 54 permits the top door 40 to be rotated into a closed position in which it extends over the otherwise open top of the housing 22. As illustrated in FIGS. 2 and 4B, the hinge 54 also permits the top door 40 to be rotated upwardly into a position in which it does not generally obscure the open top of the housing 22, permitting access to the interior area 34. Other means may be provided for movably the top door 40 relative to the housing 22, such as more than one hinge or where the top door 40 is movably mounted to the housing 22.

Figure 3:
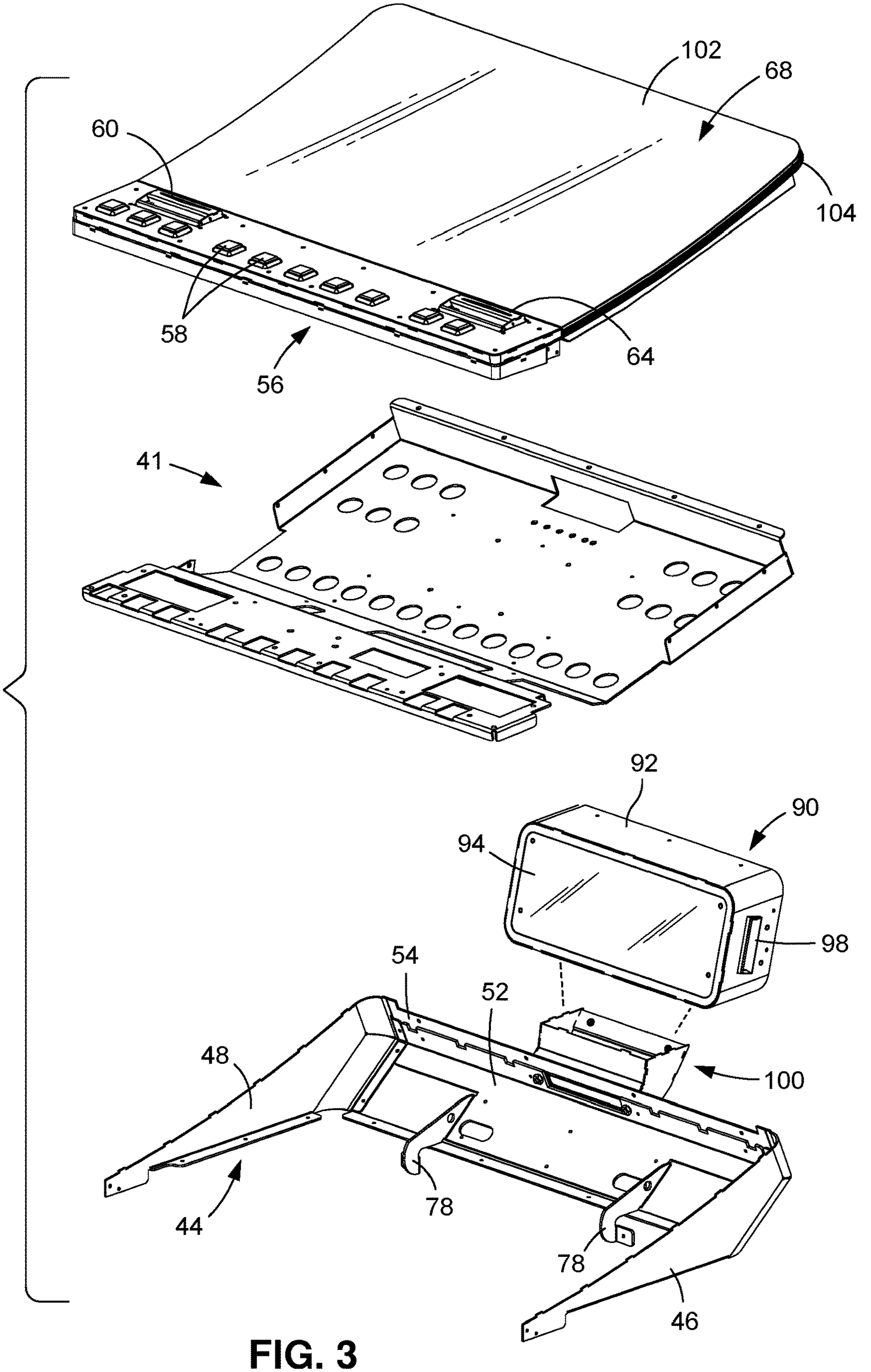
FIG. 3 is a partial exploded view of the top door of the bar top gaming unit illustrated in FIG. 1.

As indicated above and illustrated in FIGS. 1 and 3, the base member 41 of the top door 40 supports components of the bar top gaming unit 20, such as a console 56. The console 56 may be located at the top of the top door 40, such as at a front portion thereof, and may span across the top door 40 from side to side. The console 56 might comprise, for example, a panel member which is associated with the base member 41 of the top door 40. As illustrated, one or more player input devices 58 such as buttons or the like may be associated with the console 56 (such as by being mounted to the base member 41 and extending through one or more openings in the console 56 to a top thereof for access by a player). Further, the console 56 may include one or more openings therein that provide access to the interior 34 of the housing 22 when the top door 40 is closed (which openings may align with corresponding openings in the base member 41). For example, one opening and an associated bezel 60 may provide access to a media printer 62 which is located in the interior space 34 of the housing 22 (see FIG. 2). A second opening and associated bezel 64 may provide access to a media reader 66 which is located in the interior 34 of the housing 22.

Preferably, a video display 68 is also associated with the top door 40. The video display 68 is preferably a panel style display, such as an LED, OLED, plasma or similar display. As illustrated, the console 66 and display 68 may be configured, in relation to the top door 40 and frame 44, so that when the top door 40 is closed, the top of the bar top gaming unit 20 is primarily defined by the console 66 and display 68, such as where edges of the video display 68 (or as described in more detail below, a cover panel 102) and the console 56 form or define the peripheral edges of the top of the top door 40.

In one embodiment, the video display 68 may be a flat panel display. In a preferred embodiment, however, the video display 68 has a curved screen. As best illustrated in FIG. 4A, the video display 68 preferably has a concave curvature with a curve radius of 1493 mm (+/−1 mm). In such a configuration, the video display 68 curves towards the player (such as compared to a flat panel display).

As indicated, the top door 40 is movable between an open and a closed position. In one embodiment, means are provided for aiding in this movement, and preferably movement of the top door 40 from its closed to its open position. In one embodiment, at least one means for biasing is provided for biasing the top door 40 to its open position.

Referring to FIGS. 2, 4A and 4B, in one embodiment, at least one strut 72 is provided which assists in moving the top door 40 to its open position, and which preferably holds or maintains the door 40 in the open position. Preferably, the strut 72 is a gas or liquid type strut having a body 74 and a rod 76. As illustrated, two struts 72 are preferably provided, wherein each strut 72 and its mounting are configured as follows.

In a preferred configuration, the body 74 is connected to the frame 44, such as at a mounting flange 78 at the rear 52 thereof, and the rod 76 is connected to the top panel 40. In one embodiment, the rod 76 is connected to a mounting flange 80 at the bottom of the top door 40. As illustrated, the mounting flange 80 preferably extends downwardly from the top door 40. As best illustrated, the configuration of the flanges 78,80 and their mounting location is preferably selected so that, when the top door 40 is in its closed position, each strut 72 extends downwardly (from the rear towards the front of the housing 22) at angle α of about 16 degrees (+/−2 degrees) with respect to horizontal (e.g. at a negative angle). As best illustrated in FIG. 4A, in a preferred configuration, when the top door 40 is in its closed position, the second or body end of the strut 72 is located above the top of the housing 22 (at its connection to the first flange 78 associated with the frame 44), while the first or rod end of the strut 72 is located below the top of the housing 22, within the interior area 34 thereof (at its connection to the second flange 80 which extends below the top door 40).

In this configuration, when the top door 40 is closed, the biasing force generated by the strut 72 is not applied solely horizontally, which would tend to force the top door 40 towards the front 30 of the housing 22, thus tending to bind the top door 40 against the front of the housing 22 (and any associated latch and/or locking mechanism for the top door 40 as described below). Instead, the downward angle of the strut 72 results in much of the force generated thereby being directed in a downward direction, thus tending to simply keep the top door 40 in its closed position.

On the other hand, when a user desires to open the top door 40, as illustrated in FIGS. 2 and 4B, the force generated by the strut 72 aids in moving the top door 40 to its open position. In particular, the user pulls upwardly on the top door 40. As the user moves the top door 40 upwardly, the angle of the struts 72 pass horizontal (at which point the top door 40 is above the housing 22 and thus does not press into the housing 22 and bind the top door 40), and thereafter the struts 72 angle upwardly, thus pushing the top door 40 upwardly. So extended, movement of the rod 76 back into the body 74 is resisted, keeping the top door 40 raised into its open position. Upon application of sufficient pressure (as applied by a user to the top door 40), the rod 76 is compressed back into the body 74.

In one configuration, a latching and locking mechanism is provided for maintaining the top door 40 in a closed position. In a preferred embodiment, the locking mechanism includes a key-operated latch, such as where insertion of a key into a tumbler (such as accessible at the outside of the top door 40 or housing 22) which either releases or locks, or otherwise moves a latching member between latched and unlatched positions.

The bar top gaming unit 20 may include a plurality of devices for presenting one or more wagering games to a player. As indicated above, such devices or elements are preferably supported by and/or housed within the unit 20. For example, as indicated above, the bar top gaming unit 20 may include a media printer 62, such as which is located in the interior space 34 of the housing 22 and has an output slot which is aligned with the first opening and associated bezel 60 in the top door 40. The media printer 62 may, for example, be configured to print monetary-value gaming tickets for dispensing to players. The bar top gaming unit 20 may also include a media reader 66, such as which is located in the interior space 34 of the housing 22 and has an acceptor slot which is aligned with the second slot and associated bezel 62 in the top door 40. The media reader 66 may, for example, be configured to accept and read/validate currency, monetary-value gaming tickets and the like (aspects of gaming machine "ticketing" systems are well known; one such system is described in U.S. Pat. No. 6,048,269 to Burns, which is incorporated herein in its entirety by reference).

The bar top gaming unit 20 may also include one or more audio generating devices, such as one or more speakers.

The bar top gaming unit 20 may also include a gaming controller (such as comprising a processor, an associated memory and machine-readable code stored in the memory and executable by the processor) for controlling the various devices/peripherals of the bar top gaming unit 20, for presenting one or more wagering games or other information or events to a player thereof.

For example, the bar top gaming unit 20 may be configured to present one or more wagering games to a player. The player may associate funds with the bar top gaming unit 20, such as by inserting currency or a gaming value ticket into the media reader 66, which funds may be converted to monetary value credits associated with a credit balance on the unit 20. The player may then wager one or more of those credits. The gaming controller may then generate game information and cause it to be displayed by the video display 68. The information which is displayed may vary depending on the particular game and might comprise, for example, graphical representations of cards in a video poker game or symbols in a slot game. The player may provide input to the unit 20, such as via one or more of the player input devices 58, such as the buttons. For example, the player might use the buttons to select cards to be held in a video poker game.

In the event of a winning wagering game outcome, the gaming controller may be configured to award one or more credits, such as based upon a pay table of awards. The player may elect to cash-out the credit balance on the unit 20, such as by selecting a cash-out option. This may result in the dispensing of a monetary value gaming ticket to the player, such as via the media printer 62.

Of course, the bar top gaming unit 20 might have other features and be configured to operate in other manners. For example, the bar top gaming unit 20 might comprise a server-based gaming machine in which game information and/or outcomes are remotely generated and wherein the bar top gaming unit 20 utilizes that information to present the one or more games. Further, the bar top gaming unit 20 might be configured to accept monetary-value funds via account transfers, from a credit/debit card (such as via a card reader) and/or to issue funds in a similar manner (e.g. by transfer to an account or wallet, by transfer to a bank account, etc.)

As another aspect of the invention, the bar top gaming unit 20 may include a player tracking unit 90. As illustrated in FIGS. 1 and 3, in one configuration, the player tracking unit 90 comprise a housing 92 that supports various player tracking components, such as a video display 94 and a card reader (not visible). The housing 92 might have a number of shapes, such as a generally rectangular prism. In this configuration, the video display 94 may be mounted inside of the player tracking unit housing 92 and face the front thereof, and the card reader may be located in the player tracking unit housing 92 and may define a card slot 98 in a side of the housing 92.

Figure 5:
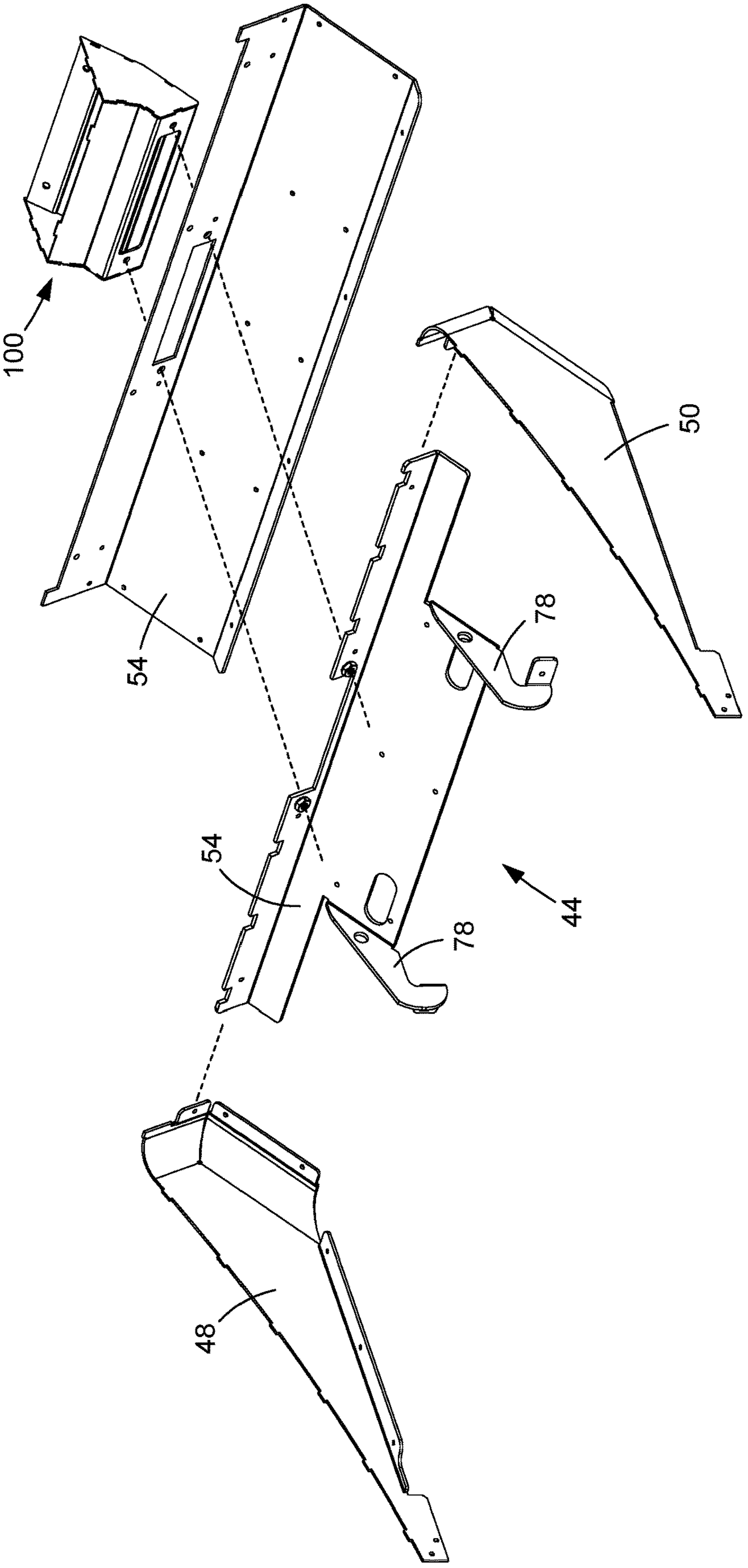
FIG. 5 is a partial exploded view of a portion of the top door of the bar top gaming unit illustrated in FIG. 1 and an associated player tracking housing.

Most importantly, as best illustrated in FIGS. 3, 5 and 6, the player tracking unit 90 is preferably mounted independently of the top door 40 so that the player tracking unit 90 does not move when the top door 40 is moved between its open and closed positions. In particular, in a preferred embodiment, the player tracking unit 90 is mounted to the frame 44, which is stationary and is mounted to the housing 22. Further, the manner of mounting allows the player tracking unit 90 to be accessible to a player when playing games at the bar top gaming unit 22, but as indicated, allows the top door 40 to be opened and closed (without the player tracking unit 90 either moving or needing to be removed or moved).

In one configuration, the housing 92 of the player tracking unit 90 is mounted to the frame 44 via a mount 100, such as illustrated in FIGS. 5 and 6. As illustrated therein, the mount 100 may have a first end and a second end. The first end may be mounted to frame 44, preferably at the rear 52 thereof. The mount 100 preferably extends outwardly and upwardly from the rear 52 of the frame 44 to the second end. The housing 92 of the player tracking unit 90 is preferably mounted to the second end of the mount 100. For example, the bottom of the housing 92 may be connected to the second end of the mount 100.

Preferably, the mount 100 is sized so that, as best illustrated in FIG. 6, the player tracking unit 90 is located rearwardly of the top door 40 a sufficient distance that the top door 40 can be moved between its open and closed position without hitting the player tracking unit 90. Further, the mount 100 is configured so that the player tracking unit 90 sits above the back of the top door 40, whereby top door 40 (in its closed position) does not interfere with the line of sight from the player to the video display 94 of the player tracking unit 90.

It will be appreciated that the elements of the player tracking unit 90 may be communicatively coupled to the bar top gaming unit controller and/or external systems (such as a casino player loyalty system, as is well known). In one configuration, a channel is defined from the housing 92 of the player tracking unit 90, through the mount 100 and through the frame 44 to the interior 34 of the housing 22. Cables, wiring or the like may be extended through that defined channel, such as between the elements of the player tracking unit 90 and the bar top gaming unit controller, a power supply, USB hub, etc.

Figure 7:
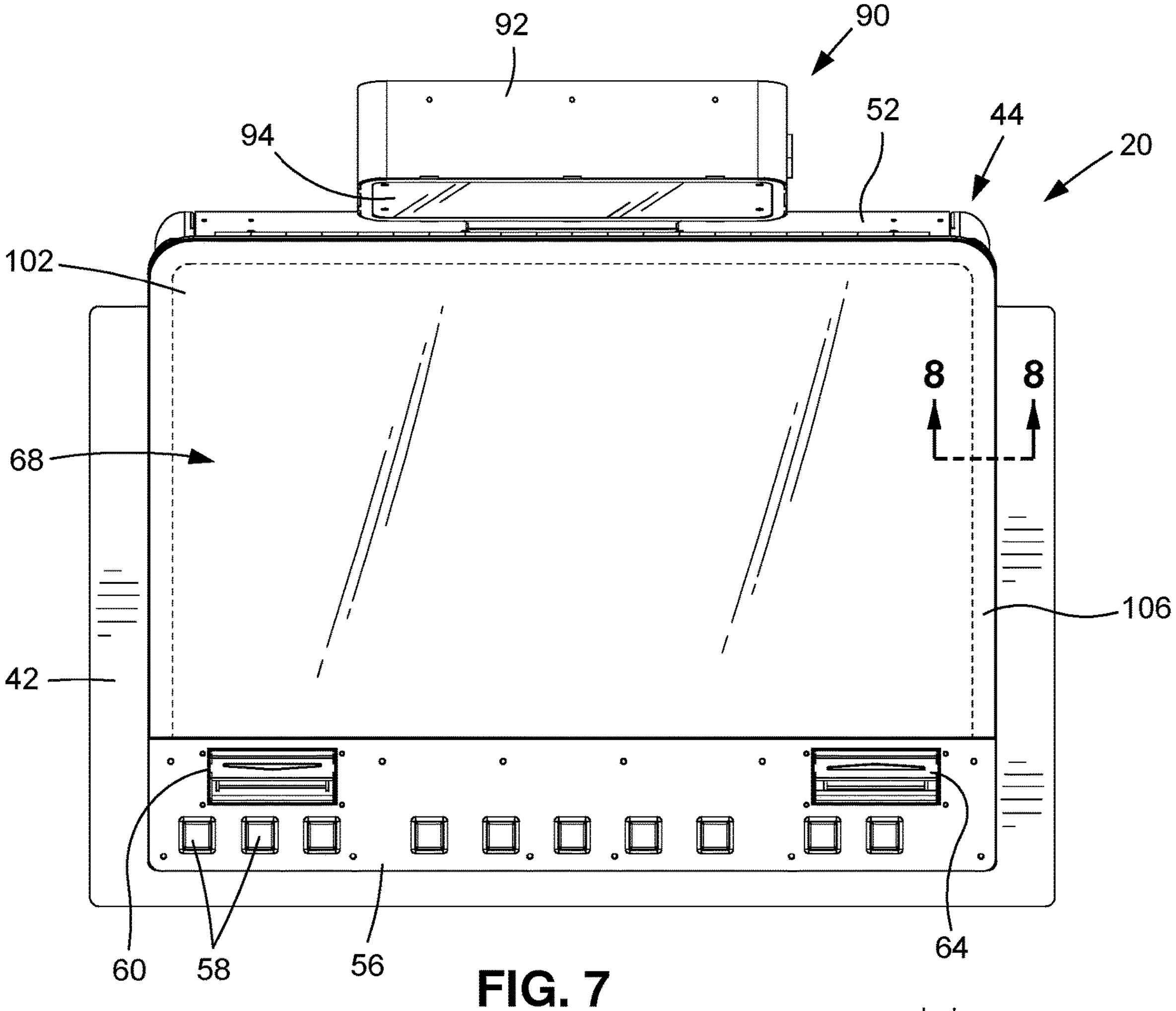
FIG. 7 is a top view of the bar top gaming unit illustrated in FIG. 1.
Figure 8:
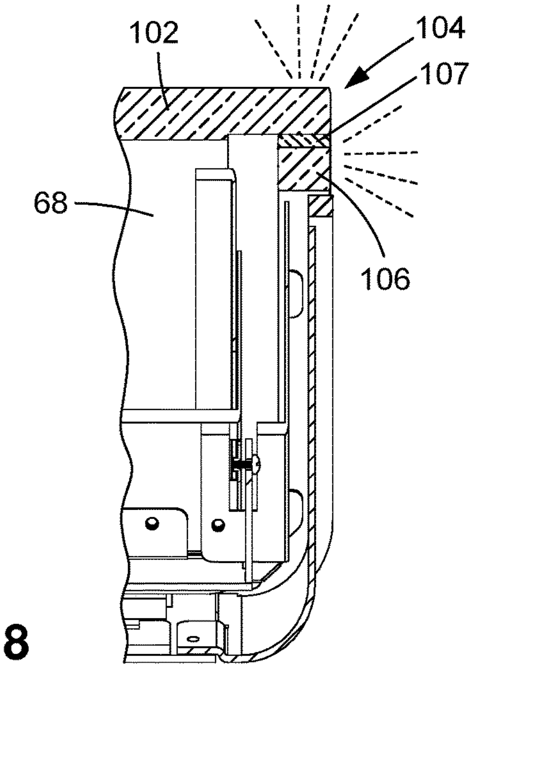
FIG. 8 is a cross-sectional view of a portion of the top door of the bar top gaming unit taken in the direction of lines 8-8 in FIG. 7.

Another aspects of the invention will be described with reference to FIGS. 7 and 8. As indicated above, in a preferred configuration, a peripheral edge of the display 68 forms a portion of the peripheral edge of the top of the top door 40. As illustrated in FIG. 8, the video display 68 is preferably mounted to the base 41 of the top door 40 for movement with the top door 40. As is well known, such a video display 68 generally comprise a display panel which displays generated graphical content. This display panel faces upwardly away from the base 41. As illustrated in FIG. 8, a cover panel 102 is located at the top of the video display 68. Such a cover panel 102 may comprise a portion of the video display 68 (such as a top polarizing layer or an overlay layer) or may comprise a separate panel. For example, the cover panel 102 may comprise a glass panel which is located over the front of the video display 68 and thru which the video display 68 may be viewed.

As illustrated in FIG. 8, in one configuration, a peripheral edge 104 of the cover panel 102 may extend outwardly beyond the video display 68, and preferably outwardly to (or slightly beyond) the peripheral edge of the top door 40. Thus, as illustrated in FIG. 7, when a player views the top door 40, the player views the peripheral edge 104 of the cover panel 102 as comprising the peripheral extent of the top door 40—in this case, at the sides and rear of the top door (as the console 56 is located at the front of the top door).

In one embodiment, at least a portion of the peripheral edge 104 of the cover panel 102 is back-lit. As illustrated in FIG. 8, in one configuration, at least one illumination element 106 is provided. The illumination element 106 may comprise, for example, one or more individual lighting elements, a light strip, a light tube or similar elements. In one embodiment, the illumination element 106 is preferably configured to illuminate the peripheral edge 104 of the cover 102 in a generally constant manner, such as in the form of a light strip. The illumination element 106 may be located under the peripheral edge 104 of the cover panel 102, thus illuminating at least the peripheral edge 104 of the cover panel 102 (such as along the sides and rear thereof, such as in a “U” shape), such as when viewed from the top (see FIG. 7). As illustrated, the illumination element 106 might also project light peripherally outwardly as well, such as to be viewed from the sides and/or rear of the top panel 40. In some embodiments, a bottom, inside wall or the like of the illumination element 106 may be reflective or light blocking, so as to prevent light from being directed inwardly towards the video display 68 and or downwardly.

In one embodiment, as illustrated in FIG. 8, a light filter 107 may be configured to reduce the amount of light which is emitted from a top of the illumination element 106 towards the cover panel 102. The light filter 107 might comprise, for example, a tinted film which is located between the top of the illumination element 106 and the bottom of the cover 102 and which is configured to reduce the amount of light which is directed from the illumination element 106 towards the cover panel 102 (and thus the player). In one embodiment, the light filter 107 might be applied to the bottom of the cover panel 102, such as at the peripheral edge 104 thereof at the area of the illumination element. In such a configuration, while the illumination element 106 has a high brightness when viewed from the sides, it has a lower brightness when viewed by a player facing the video display 68. Of course, other configuration of light filters 107 might utilized, such as where a top portion of the illumination element 106 has an increased opaqueness as compared to the sides, where the cover panel 106 has light filtering properties, such as built into the glass or other material thereof, etc.

The housing 22 and other components may be formed from a variety of materials. As indicated, it is preferred that the housing 22, frame 44 and other structural members of the bar top gaming unit 20 be constructed of metal. Alternatively, these and other elements may be constructed from composites or other materials.

As described, the bar top gaming unit has a number of advantages, including associated with various features thereof. It will be appreciated that features of the bar top gaming unit may be used in combination, such as described herein, but may also be used independently. For example, a bar top gaming unit might include the player tracking unit mounting configuration described herein without including the cover panel configuration and/or without including the top door biasing configuration.

It will be understood that the above described arrangements of apparatus and the method therefrom are merely illustrative of applications of the principles of this invention and many other embodiments and modifications may be made without departing from the spirit and scope of the invention as defined in the claims.

What is claimed is:

1. A bar top gaming unit comprising:

a housing having a base and at least one wall extending upwardly to a top, said housing generally defining an interior area, said housing having a front and a rear;

a frame mounted to said housing and extending upwardly from said top of said housing, said frame having a front and a rear;

a top door rotatably mounted to said frame at said rear thereof, said top door movable between a first position in which said top of said housing is generally open providing access to said interior area and a second position in which said top door cooperates with said frame to generally close said top of said housing; and a biasing strut, said biasing strut having a first end and a second end, said first end mounted to said frame with said first end located above said top of said housing and said second end mounted to said top door, said biasing strut extending downwardly at an angle below horizontal from a rear towards said front of said housing and located below said top of said housing when said top door is in said second position, and wherein said biasing strut biases said top door upwardly when said top door is in said first position.

2. The bar top gaming unit in accordance with claim 1, wherein said first end of said biasing strut is mounted to a first flange of said frame and said second end is mounted to a second flange extending downwardly from a bottom of said top door.

3. The bar top gaming unit in accordance with claim 2, wherein said top door comprises a base and said second flange extends downwardly from said base.

4. The bar top gaming unit in accordance with claim 3, wherein said second flange extends into said interior area of said housing.

5. A bar top gaming unit comprising:

a housing having a base and at least one wall extending upwardly to a top, said housing generally defining an interior area, said housing having a front and a rear;

a top door mounted for rotation relative to said housing, said top door movable between a first position in which said top of said housing is generally open providing access to said interior area and a second position in which said top door closes said top of said housing; and a biasing strut, said biasing strut having a first end and a second end, said first end located vertically above said top of said housing and said second end located below said first end and below said top of said housing when said top door is in said second position, and wherein said biasing strut biases said top door upwardly when said top door is in said first position, said first end and said second end of said biasing strut being located above said top of said housing when said top door is in said first position.

6. The bar top gaming unit in accordance with claim 5, wherein said housing has a horizontal top and said biasing strut extends downwardly towards said second end at an angle $\alpha$ relative to said horizontal top when said top door is in said second position.

7. The bar top gaming unit in accordance with claim 5, wherein said second end of said biasing strut is connected to a flange at a bottom of said top door.

8. The bar top gaming unit in accordance with claim 5, wherein said top door has a top side and a bottom side, said bottom side facing said housing, a video display is located at said top side.

9. The bar top gaming unit in accordance with claim 5, further comprising a flange which extends upwardly from said top of said housing, said top door rotatably connected to said flange.

10. The bar top gaming unit in accordance with claim 9, wherein said first end of said biasing strut is connected to said flange.

11. The bar top gaming unit in accordance with claim 9, wherein said housing has a front and a rear and said flange extends upwardly from said housing a first distance at said front of said housing and a second distance at said rear, said second distance greater than said first distance.

12. The bar top gaming unit in accordance with claim 11, wherein said top door has a top which angles downwardly from said rear of said housing towards said front of said housing.

* * * * *